(No Model.) 2 Sheets—Sheet 1.
A. MARKS.
SAW GUIDE.
No. 561,411. Patented June 2, 1896.
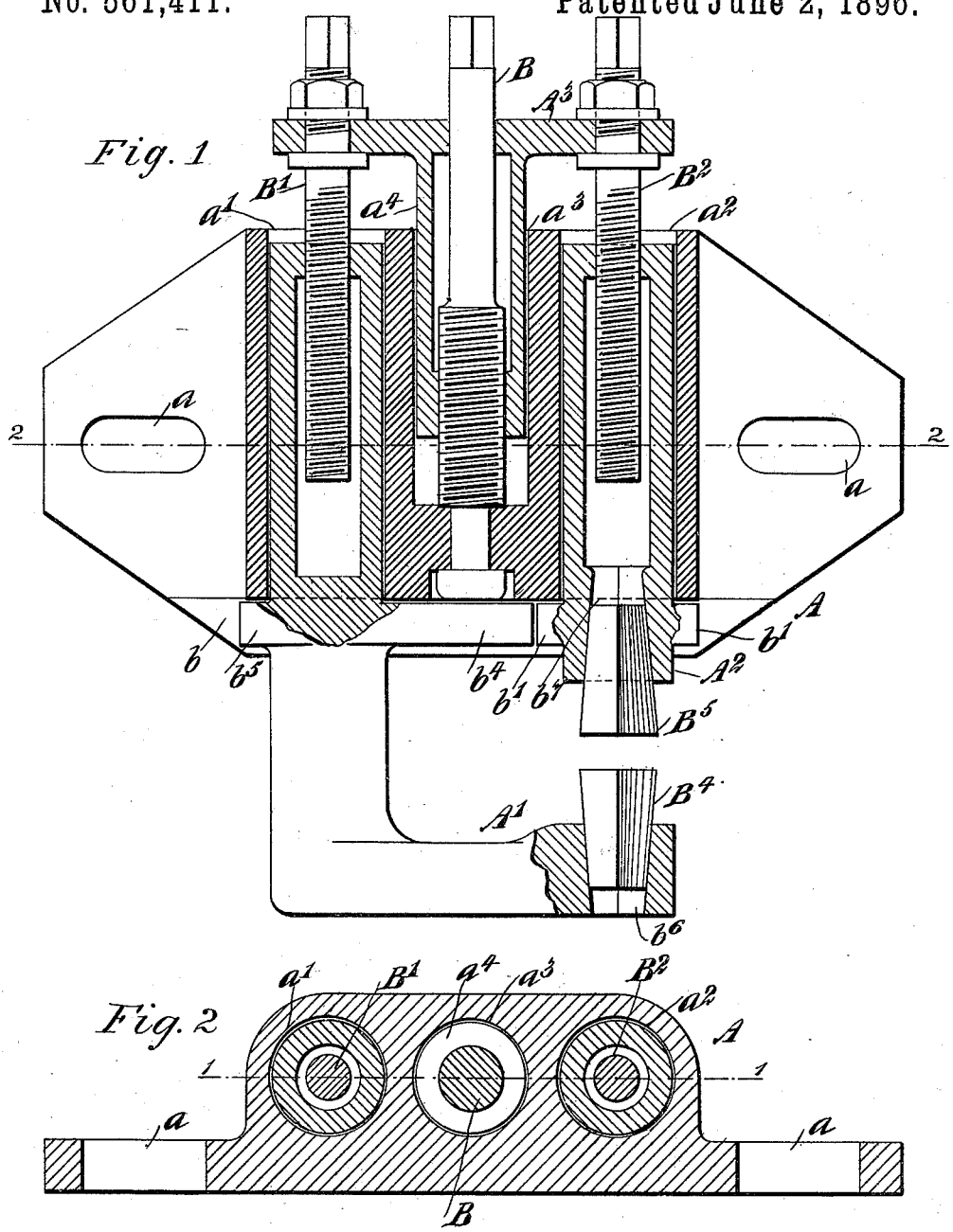
WITNESSES:
J. B. Walker
C. R. Ferguson
INVENTOR
A. Marks
BY
Munn & Co
ATTORNEYS (No Model.) 2 Sheets—Sheet 2.
A. MARKS.
SAW GUIDE.
No. 561,411. Patented June 2, 1896.
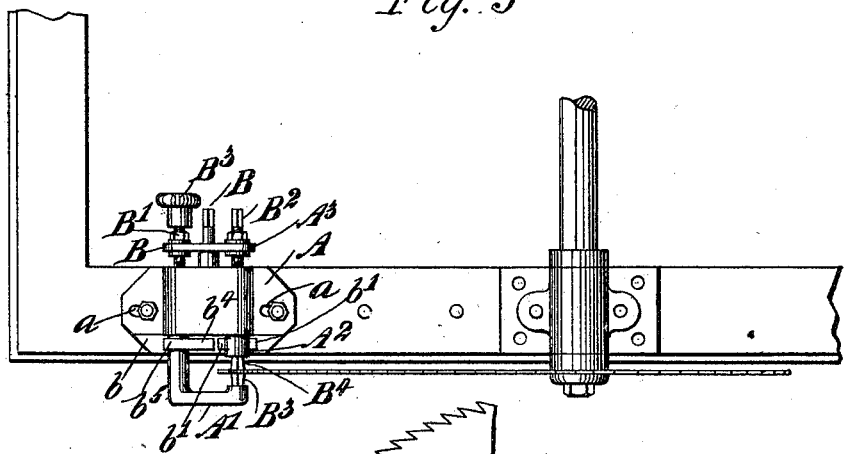
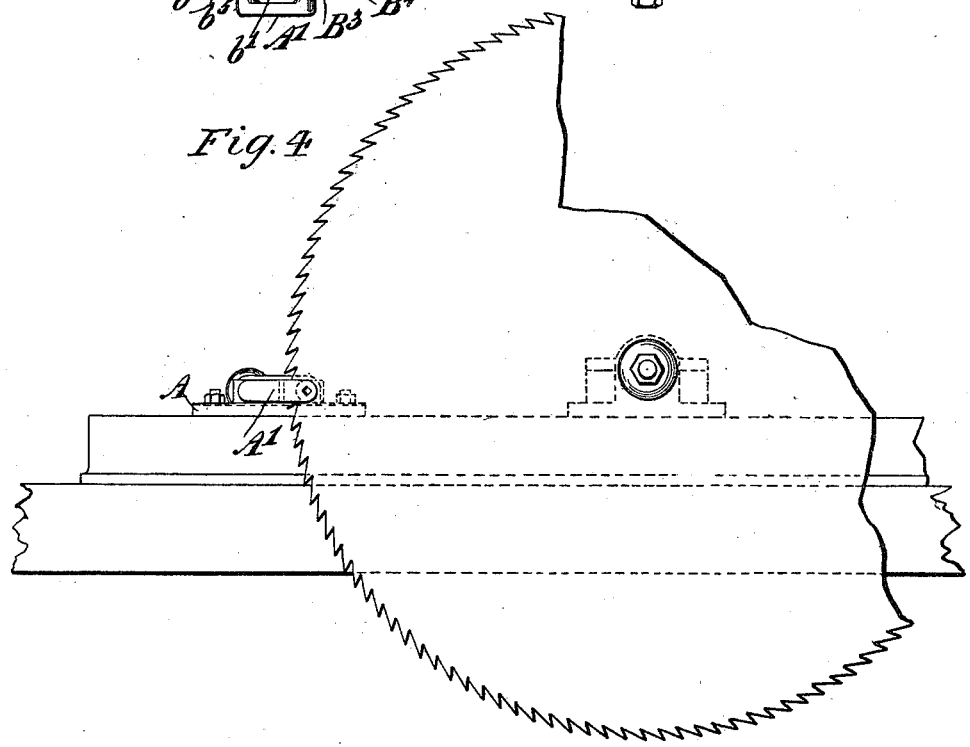
WITNESSES:
J. B. Walker
C. R. Ferguson
INVENTOR
A. Marks
BY
Munn & Co.
ATTORNEYS

UNITED STATES PATENT OFFICE.

ALPHONSO MARKS, OF McCOMB, OHIO.

SAW-GUIDE.

SPECIFICATION forming part of Letters Patent No. 561,411, dated June 2, 1896.

Application filed December 13, 1895. Serial No. 572,065. (No model.)

*To all whom it may concern:*

Be it known that I, ALPHONSO MARKS, of McComb, in the county of Hancock and State of Ohio, have invented certain new and useful Improvements in Saw-Guides, of which the following is a full, clear, and exact description.

This invention relates to guides for circular saws, and the object is to provide a simple device for this purpose that may be easily and quickly adjusted without danger to the operator, and in which the jaws may be adjusted independently or together.

I will describe a saw-guide embodying my invention and then point out the novel features in the appended claims.

Reference is to be had to the accompanying drawings, forming a part of this specification, in which similar characters of reference indicate corresponding parts in all the figures.

Figure 1 is a partial plan and partial section on the line 1 1 of Fig. 2 of a saw-guide embodying my invention. Fig. 2 is a section on the line 2 2 of Fig. 1. Fig. 3 is a plan view showing the guide as attached to a saw-frame and in connection with a saw, and Fig. 4 is an elevation of the same.

Referring to the drawings, A designates a bed-plate having slot-openings $a$, through which bolts extend to secure the device to the saw-frame in such a manner that it may be adjusted toward or from the axis of the saw, and the body of the bed-plate is provided with transverse openings $a'$ $a^2$, in which the shank portions of guide-jaws A' A² may slide, and the plate is also provided with a recess $a^3$ to receive the slide $a^4$ of a cross-head A³.

The slide $a^4$ is tubular and its inner end is internally screw-threaded to engage the thread of an adjusting-screw B, one end of which has a swivel connection in the end wall of the recess $a^3$ and the other end or stem portion of which is projected through an opening in the cross-head. The shank portions of the jaws A' A² are also tubular and they are respectively engaged by adjusting-screws B' B², carried by the cross-head A³. The outer ends of the screws B B' B² are made angular, so as to be engaged by a key B³, for the purpose of turning them. As this key is removable it may be laid away while the saw is running, so as to prevent the possibility of any one turning the screws to shift the jaws when such shifting is not desired.

Obviously either one of the jaws may be adjusted by turning its screw B' or B² to provide for the thickness of a saw, and also that both jaws may be simultaneously adjusted by means of the screw B. As a means to steady the jaw A' and prevent its rotation I provide it with an arm $b^4$, extended lengthwise of the bed-plate and adapted to rest on a planed table $b$ on the bed-plate, and also with a projection $b^5$, extended in the opposite direction to the arm $b^4$ and resting on the said table to prevent a backward rotation of the jaw. The jaw A² is prevented from turning by means of oppositely-extended wings $b'$, adapted to rest or bear upon the table. By this construction it is obvious that the jaws are interchangeable, thus providing for the use of the guide on either the right or left hand of a saw.

The outer jaw A' is substantially L-shaped, and its end is provided with an opening $b^6$ in line with a similar opening $b^7$ in the end of the inner jaw A². In the respective openings $b^6$ $b^7$ wooden plugs B⁴ B⁵ are tightly driven and are designed to engage respectively against the outer and inner sides of the saw. The plugs B⁴ B⁵ are tapered longitudinally and are angular in cross-section to engage in the correspondingly-shaped openings to prevent rotary movement of the plugs. The plugs when worn out may be easily removed or driven out by force applied against their small ends.

Having thus described my invention, I claim as new and desire to secure by Letters Patent—

1. In a saw-guide, the combination of a rigid body portion, the body portion having three transverse passages, two jaws having shanks respectively movable in two of the transverse passages, a cross-head having a shank movable in the third transverse passage, two screws connected to the cross-head and respectively connected to the shanks of the jaws, and a third screw rotatably carried by the body portion and having threaded connection with the cross-head, substantially as described.

2. In a saw-guide, the combination of a rigid body portion having three transverse passages, two jaws each having a hollow shank respectively movable in two of the transverse passages, each jaw also having an arm engaging the body portion, a cross-head having a shank movable in the third transverse passage, two screws revolubly mounted in the cross-head and respectively thread connected with the shanks of the jaws, and a third screw revolubly carried by the body portion and projected through the shank of the cross-head, the third screw coöperating with threads on said shank, substantially as described.

3. In a saw-guide, the combination with a rigid body portion having three transverse passages, of two jaws each having a shank respectively movable in two of the passages, a screw coöperating with the shank of each jaw, a cross-head by which the screws are revolubly carried, the cross-head having a shank movable in the third passage, and a third screw revolubly carried by the body portion and passed through the shank of the cross-head and beyond the cross-head, substantially as described.

4. In a saw-guide, the combination with a rigid body portion having three transverse passages and a table adjacent to the passages, of two jaws, the shanks of which are respectively movable in two of the transverse passages, the jaws each having an arm engaging the table at different points on the surface of the table, a screw coöperating with each shank, a cross-head having a hollow shank movable in the third passage, and a third screw having a head by which the screw is revolubly held in the body portion, the third screw being projected through the shank of the cross-head and beyond the cross-head, substantially as described.

ALPHONSO MARKS.

Witnesses:
J. C. LIGHT,
E. R. EASTMAN.